United States Patent
Nyborg et al.

(10) Patent No.: US 8,499,938 B2
(45) Date of Patent: Aug. 6, 2013

(54) CLEANING AND SEPARATION SYSTEM FOR TUBERS

(76) Inventors: Bruce David Nyborg, Idaho Falls, ID (US); William C. Geyer, Idaho Falls, ID (US)

( * ) Notice: Subject to any disclaimer, the term of this patent is extended or adjusted under 35 U.S.C. 154(b) by 834 days.

(21) Appl. No.: 12/581,877

(22) Filed: Oct. 19, 2009

(65) Prior Publication Data
US 2010/0096301 A1    Apr. 22, 2010

Related U.S. Application Data

(60) Provisional application No. 61/106,439, filed on Oct. 17, 2008.

(51) Int. Cl.
*B07C 5/12* (2006.01)
(52) U.S. Cl.
USPC .......................................... 209/667; 209/658
(58) Field of Classification Search
USPC ................. 209/656, 659, 660, 667–673, 658, 209/657; 460/90–95, 133, 142, 144–148
See application file for complete search history.

(56) References Cited

U.S. PATENT DOCUMENTS

| | | | | |
|---|---|---|---|---|
| 2,964,181 A * | 12/1960 | Demarest et al. | ............. | 209/654 |
| 3,004,663 A * | 10/1961 | Creoglio | ....................... | 209/654 |
| 4,213,533 A * | 7/1980 | Sardo | ............................ | 209/654 |
| 2001/0037636 A1 * | 11/2001 | Mitchell | ........................ | 56/330 |

* cited by examiner

*Primary Examiner* — Joseph C Rodriguez
*Assistant Examiner* — Kalyanavenkateshware Kumar
(74) *Attorney, Agent, or Firm* — Angus C. Fox, III

(57) ABSTRACT

An entire harvested ground fruit load is subjected to a first cleaning process on a cleaning table, which separates the smaller ground fruits, soil, stones, clods, vine stems, grasses and other debris from the larger ground fruits. The fall-through burden from the cleaning table is subsequently subjected to a second separation step using a pintle belt conveyor equipped with at least one spinning shear roller. Soil particles, stones, clods, vine stems, grasses and other debris fall between the pintles of the pintle belt conveyor and are discarded, while small ground fruits are moved by the spinning shear roller(s) and either recombined with the main ground fruit load or diverted to a separate path for storage. Operational speed of the pintle belt conveyor and rotational speed of the shear rollers can be adjusted to maximize the breakup of clods which impact the shear roller(s).

10 Claims, 8 Drawing Sheets

CLEANING AND SEPARATION SYSTEM FOR TUBERS

This application has a priority date based on Provisional Patent Application No. 61/106,439, which has a filing date of Oct. 17, 2008, and is titled CLEANING AND SEPARATION SYSTEM FOR TUBERS.

FIELD OF THE INVENTION

The present invention relates, generally, to root and tuber crop cleaning and separating equipment. It also relates to root crop and tuber crop harvesters which extract those crops from soil and load them onto trucks for bulk carriage. The invention further relates to root crop and tuber crop harvesters which incorporate root crop and tuber crop cleaning and separating equipment.

BACKGROUND OF THE INVENTION

Harvesting root crops, such as beets, turnips and carrots, and tuber crops, such as potatoes and sweet potatoes, presents unique problems because the roots and tubers develop well below the surface of the soil. Potatoes, for example, typically grow up to 12 inches below the surface. Thus, in order to harvest these crops, the roots or tubers must be lifted from the soil and separated from considerable quantities of soil, clods, rocks, stems, and other debris. In addition, as most root and tuber crops have a very high water content and little, if any, protective covering, they can be easily damaged by impact with other objects. Thus, vertical drops within the harvester must be minimized.

Typical potato, or tuber, harvesters utilized in the United States, such as those currently manufactured by the Grimme Group (headquarted in Damme, Germany), and those previously manufactured by Lockwood Corporation (of Gering, Nebr.); Logan Corporation (of Logan, Iowa), Double L Manufacturing (of American Falls, Id.), and Thomas Equipment (of Centerville, New Brunswick, Canada), are typically equipped with a front blade that breaks up the soil and dislodges the tubers as it is pulled through the ground. Continual forward movement of the blade also forces the dislodged tubers, along with their stems, and a considerable amount of soil, clods, rocks and other debris onto a recirculating conveyor surface that transports the tubers, soil, clods, rocks and debris toward the rear of the harvester. The conveyor surfaces typically consist of parallel bars that are aligned perpendicular to the direction of travel, spaced about 50 mm (about 2 inches) apart, and interconnected by heavy belting. Historically, the conveyer surfaces were formed from steel rods that had interlinked loops at their ends and midpoint so as to form a broad chain that looked like a moving grate made of parallel bars. Though the looped interlinkages have generally been replaced by the heavy belting, which is much less susceptible to the abrasive action of silica sand particles in the soil, the conveyors are still referred to as elevator, harvester, or digger "chain." Specifically, when the rods are affixed to heavy belting, this conveyor surface is called "belted chain." Two belted chains are typically used on each potato harvester. The first, or primary, belted chain moves the potatoes mostly rearward, but also slightly upward. The conveyor drive and support sprockets associated with the primary belted chain are designed to shake the conveying surface, thereby causing loose soil, rocks, and debris to fall through the parallel rods of the belted chain as the harvested potatoes are moved rearward on the harvester. The second, or secondary, belted chain functions mainly to elevate the potatoes and subsequently drop them and the remaining soil, rocks and debris onto a transverse conveyor positioned at the upper rear of the potato harvester. The transverse conveyor may be constructed either of parallel rods or of powered finger rollers. Then potatoes are then deposited on a slanted elevator conveyor, which moves them upward, toward the front of the harvester, and loads them onto a "cleaning table." Such a cleaning table is disclosed in U.S. Pat. No. 4,471,876 to John Stevenson, Jr., et al. The cleaning table sorts newly harvested tubers or root crops of at least a set minimum size from vines, soil, clods, rocks, other debris, as well as from harvested tubers or root crops that are smaller than the set minimum size. The table includes an inclined deck comprised of a plurality of spaced apart, parallel longitudinal rollers that operate in pairs, rotating toward one another when viewed from the top. The rollers are formed of a resilient, deformable material such as rubber, soft plastic or the like. One of each pair of rollers can have an elongate helical rib, flute, or flight extending from end to end. As the tubers or root crops and associated debris roll longitudinally down the table over the rollers, vines, soil, clods, stones, other debris, and small tubers or root crops are pulled into the gaps between the counter-rotating pairs of rollers and fall to the ground. Hard objects pass through the resilient, deformable rollers without causing damage to the rollers. Cleaning tables having rollers arranged with their rotational axes in a generally level plane, which rotate in the same direction, have also been designed and manufactured. This type of level cleaning table typically uses multiple star rollers, each of which has a series of resilient, evenly-spaced, star-shaped flanges positioned along its length. The rotating star rollers cause the crop load to advance from one side of the cleaning table to the other. Objects in the load, which are smaller than a fixed size are pulled through the table by the resilient projections on the star-shaped flanges of the rollers and fall to the ground. The pitch between rollers on most cleaning tables is adjustable, so that the size and amount of material discarded can be varied.

After passing the cleaning table, the tuber or root crop load falls onto a boom conveyor made of belted chain, which drops finally drops the potatoes into a self-unloading bulk truck, which drives in unison with the harvester. The technology used in potato harvesters to separate the potatoes from the soil, clods, rocks and debris is old and has changed very little since the introduction of early patented potato harvesters. U.S. Pat. No. 1,650,753 to Charlie Jasperson and U.S. Pat. No. 1,715,218 to Frank R. Wright, et al. are representative examples of such early potato harvesters. On each of these harvesters, a slanted conveyor of parallel rods moves the potatoes upward while letting the soil and debris fall through to the ground. Inasmuch as soil cushions the potatoes from injury, called "bruising," the removal of soil from the potatoes too early during the harvesting process increases bruising. Thus, harvester operating speed is optimally adjusted so that the soil is removed from the potatoes and falls between the conveyor rods to the ground just before the potatoes are deposited into the accompanying truck. Padded, or flighted, conveyor rods are used to cushion the potatoes at drop points and prevent rollback on the elevator sections.

A significant advance in soil removal methodology was provided by a stone separation table that is the subject of U.S. Pat. No. 5,425,459 to Malcolm P. Ellis, et al. The stone separation table can be incorporated into a standard harvester for potatoes or other root crops at one of the horizontal conveying levels, and is typically installed in the potato processing path just before the potatoes reach the loading boom. The stone separation table selectively separates and drops stones, clods, and soil between a series of coplanar rollers while conveying the potatoes or other root crops from one side of the table to the other. The table incorporates sets of rollers including separating and spacing rollers of substantially the same diameter. Unlike the rollers of some cleaning tables, all rollers are driven in the same direction of rotation. The separating rollers are constructed with projecting elements, which may be either projecting fingers of a star roller or bristles of a brush roller. Stones, clods, soil, other debris, and even small tubers are carried downward by the projecting elements of the separating rollers through the gaps between the separating rollers and their associated spacing rollers and allowed to fall to the ground. The distance between the separating rollers and the associated spacing rollers can be adjusted to change the size of stones, clods and small tubers that are dropped out. Typically, the separating table is set up to run with less than 2.5 cm (approximately 1 inch) gaps.

In addition to its use as a cleaning apparatus, the separating table can also be used as a sorter or sizer. When used as a sorter or sizer, the roller pitch is adjusted so that tubers smaller than a desired size drop through the table.

Problems Associated With Current Technology

Efficient soil and clod removal is the most difficult function for modern harvesting equipment. Soil that is not removed from the tubers will be transported to bulk storage facilities. Such residual soil greatly increases the likelihood of spoilage during storage. Thus, before tubers enter bulk storage, they are subjected to one or more cleaning steps, which may utilize chain conveyors, large cleaning tables, and even manual labor for hand removal of residual soil, clods, stones, and other debris. Soil removed during the final cleaning steps must be hauled back to the field.

Unfortunately, field conditions are highly variable. A harvester that functions properly in one portion of the field may pick up too much soil or clods in another. Tractor ground speed and power take off speeds are presently the only means for adjusting cleaning effectiveness of the harvester as it collects tubers from the field. Using currently-available technology, control over the size of tubers collected by a harvester is limited to selection of a desired spacing between the parallel rods of the belted digger chains and/or adjustment of the pitch—and, thus, gaps—between rollers which make up the separation table. For russet potatoes, which comprise about 80 percent of total US production, belted conveyor chains having a 50 mm center-to-center spacing of parallel rods are typically employed. As the rods are about 12.5 mm, or one-half inch, in diameter, the gaps between the rods are about 37.5 mm, or 1½ inch. Thus, tubers having a diameter of less than about 1½ inches will fall through the chain and be discarded. As belted digger chain is very expensive, the purchase of multiple sets of various sizes is usually not an option. In addition, the use of belted chain having more-closely-spaced rods for the recovery of smaller potatoes results in a much slower removal of soil, clods, stones, and other debris. As a result, harvester ground speed would need to be significantly reduced to allow sufficient cleaning to occur. Using currently-available technology, the economic loss caused by a reduction in harvester speed will not be offset by the extra value of smaller potatoes recovered using belted chain with narrower rod spacing.

On the other hand, even if harvester speed is reduced, tubers smaller than the gaps between the rods of the belted chain will fall through and be lost. Using currently-available technology, which sorts only by size, clods which are the same size or larger than the minimum size of tuber sought to be recovered cannot be automatically separated from the tubers. The present generation of tuber harvesters relies almost exclusively on vibration to break up clods. Consequently, even if harvester ground speed is reduced, the use of belted chain having more closely-spaced rods increases the soil cushioning, increases the load on the harvester, and hampers the disintegration of clods, causing more clods to be carried to storage. Thus, using available equipment, harvesting costs increase, and long-term storage of tubers suffers as the targeted size of harvested tubers decreases. Conversely, harvesting costs decrease and long-term storage of tubers improves as the targeted size of harvested tubers increases. What tuber farmers attempt to do is determine an optimum size for recovered tubers that will result in the largest bottom line figure, which will be calculated by deducting harvesting costs from the revenue received from the sale of harvested crops following storage.

Another cleaning device that has been used heretofore by the vegetable and fruit packing industry, and to a limited extent by the U.S. potato industry, is known as a pintle belt conveyor. The traditional rods of a cleaning conveyor are replaced with closely spaced bars to which are attached narrow, upright, soft coated fingers called "pintles". The pintle belt conveyor has proven particularly adept at removing vines and grasses from the recovered crop. For this application, the pintle belt is placed on a steep incline, and the conveying surface of the pintle belt is run uphill. The harvested crop (e.g., tubers) is introduced at the top of the incline. As the individual vegetables, pieces of fruit, or tubers roll down the belt to a bottom conveyor, grasses and vines are caught by the fingers of the pintle belt. As the belt returns to the bottom of the incline, the grasses and vines are removed from the fingers, often with the aid of high-pressure air flows. The fruit, vegetables or tubers, clods and stones all roll to the bottom of the pintle belt, where they are collected by another conveyor belt. To date, the pintle belt has been used primarily to remove vines and grasses from the collected crop.

One manufacturer, Grimme Group, has used a generally level pintle belt conveyor coupled with a diagonally-positioned, powered roller—acting as an unloader, or shear—on a small, one-row tuber harvester. The roller, which is positioned so that its rotational axis is parallel to the upper surface of the pintle bent, spins in a direction opposite that of the surface of the pintle belt. In this application, the pintle belt conveyer and shear roller are positioned after the secondary set of chains, on the transverse conveyor. In the Grimme application, the entire load coming off of the secondary cleaning chains—including potatoes of all sizes, remaining stones, clods and other debris—is loaded onto and transported by the pintle belt conveyor. Vines and grasses are captured by the fingers of the pintle belt and pass beneath the spinning roller, while the potatoes, stones, and clods are offloaded by the spinning roller. In this application, the fingers of the pintle belt conveyor eliminates vines and grasses more effectively than a simple rod conveyor. Although the Grimme Group system eliminates vines and grasses better than a simple rod conveyor system, cleaning is not very effective, as the pintle belt and roller must deal with the entire harvested conveyor load, which includes potatoes of all sizes, as well as stones and clods. A spinning roller has also been commonly used on fixed location conveyor applications in potato packing plants to move potatoes from one conveyor to another.

SUMMARY OF THE INVENTION

The present invention includes a method and apparatus for more rapidly and effectively cleaning a harvested load of root or tuber crops and for concomitantly recovering small tubers and other in-ground-formed crops which would ordinarily be lost, by conventional equipment during the harvesting process. Crops such as beets and carrots are taproot crops, where as tubers are actually modified stem crops. Thus, tubers cannot be accurately referred to as root crops and root crops cannot be referred to as tubers. As the equipment and process are applicable to both tuber crops and root crops, both will be referred to as ground fruit as a means of simplifying the description of the process.

The more rapid cleaning process provides the added benefit of enabling the forward operational speed of harvesters so equipped to be increased. The method includes subjecting the entire harvested load to a first separation step using a cleaning table, whereby ground fruit of a fixed size and smaller, along with stones, clods, soil and other debris are separated from ground fruit that are larger than the fixed size. The fixed size is set so that nearly all of the stones and clods are eliminated from the larger ground fruits. The ground fruit, stones, clods, stems, soil and other debris that have been separated out are subjected to a second separation step using a pintle belt continuous-loop conveyor having at least one diagonally-positioned spinning shear roller located near the exit end of the pintle belt conveyor, which not only removes the small ground fruits from the surface of the pintle belt conveyor, but also assists in the breakup of clods which strike the spinning roller(s). Travel speed of the pintle belt conveyor and rotational speed of the spinning shear roller are adjustable so as to maximize disintegration of clods without damaging ground fruit as both impact the spinning shear roller. Particles from disintegrated clods, stones, ground fruit vine remnants, grasses and other debris either fall between the pintles or become trapped by the pintles and are carried beneath the spinning shear roller and are discarded as the pintle belt conveyor is inverted during its return to the entrance end of the conveyor. The spinning shear roller can either divert the small ground fruits back into the flow of ground fruits which are larger than the fixed size, and which passed over the rollers of the cleaning table, or divert them onto a separate unloading conveyor which will maintain the smaller ground fruits separate from those greater than the fixed size. These two options can be handled by selected positioning of the shear rollers. If angled to offload the small ground fruits on one side of the pintle belt conveyor, they are recombined with the main load of larger ground fruits. If angled to offload the small ground fruits on the other side of the pintle belt conveyor, the small ground fruits are maintained in a separate conveyor flow and directed to a separate discharge apparatus.

The method can be implemented by modifying a conventional tuber harvester so that the belted chain of the harvester delivers the entire harvested load, which includes ground fruits of all sizes, stones, clods, stems, grasses and other debris to the entrance side of a cleaning table, which effects the first separation process. Roller spacing is set on the cleaning table so that ground fruits larger than a fixed size remain on top of the table as the tubers roll across the table to a conveyor at the exit side of the cleaning table. Everything in the conveyor load that is of the fixed size and smaller, including small ground fruits, stones, clods, soil and other debris, fall through the cleaning table rollers. The entire fall-through burden from the cleaning table is then subjected to the second separation process by directing it to the entrance end of a pintle belt conveyor having at least one diagonally-positioned spinning shear roller located near the exit end thereof. The pintle belt conveyor is constructed by replacing the conventional rods of a cleaning conveyor with narrowly spaced rods, each of which has two rows of soft-coated pintles attached thereto. Spacing between the pintles is set so that the small ground fruits will not fall between them. In other words, the pintles support the small ground fruits, while stones, clods, soil, vine stems, grasses and other debris items which are smaller than the pintle spacing either fall between the pintles or are trapped by them. Travel speed of the pintle belt conveyor and rotational speed of the spinning shear roller(s) are adjustable so as to maximize soil removal and disintegration of clods without damaging ground fruits as both impact the spinning shear roller. Particles from disintegrated clods, stones, ground fruit vine remnants, and other debris which fall between the pintles, or become trapped by them, are carried beneath the spinning shear roller and fall to the ground as the pintle belt is inverted during its return beneath the conveying surface. The entrance end of the pintle belt conveyor can be positioned either directly below the cleaning table so that the fall-through burden from the cleaning table is immediately subjected to cleaning on the pintle belt conveyor, with the cleaned small ground fruits being returned to the level of the cleaning table by a belted elevator chain, or the fall-through burden from the cleaning table can, first, be returned to the output level of the cleaning table (i.e., the level at which the larger ground fruits are being conveyed) with a belted elevator chain, where the second separation (cleaning) process is effected.

The pintle belt conveyor and power shear roller is superior to existing technology at separating ground fruits smaller than 1½ inch from stones, soil and other debris. In one tested configuration for use on existing tuber harvesters, the pintle belt conveyor and power roller spinning shear is placed on existing designed harvester running transversely beside the transverse fixed section of the boom conveyer. For a preferred embodiment of the invention, two four-inch steel vertically-stacked rollers are used as the shear in order to better handle small ground fruits having a wide range of sizes. The entire roller unit is adjustable both as to angle and height over the belt. The surface of each of the vertically-stacked rollers nearest the pintle belt is moving in a direction opposite that of the upper surface of the pintle belt. Thus, small ground fruits are rolled back and sideways off the pintle belt conveyor by the shear rollers. The rotational speed of the powered shear rollers, as well as the forward speed of the pintle belt conveyor, can each be separately adjusted to optimize the separation of small ground fruits from the soil, stones, stems, and other debris, as well as the breakup of clods into soil as they strike the shear rollers. A high percentage of the clods within the small ground fruit stream are broken up on impact with the spinning rollers. The resultant soil falls between the pintles, moves out with the debris stream beneath the spinning rollers, and falls from the surface of the pintle belt when the latter reverses direction beneath the conveying surface.

The present invention has at least two main aspects. The first is the use of a two-step separation and cleaning process whereby the entire harvested load is subjected to a first separation step on a cleaning table, which separates the smaller ground fruits, stones, clods, stems, grasses and other debris from the larger ground fruits, and the fall-through burden from the cleaning table is subsequently subjected to a second separation step using a pintle belt conveyor having a spinning roller shear, which effectively removes nearly all extraneous material from the smaller ground fruits. The second aspect of the present invention relates to the unique use and design of the pintle belt conveyor and spinning shear. This is the first use of an adjustable-speed pintle belt in conjunction with an adjustable-speed spinning roller shear as a device to separate ground fruits from stones and clods, and it is also the first use of a pintle belt conveyor and spinning roller shear to break up and eliminate clods from harvested crops. Cleaning efficiency of the entire load is greatly enhanced through this two-step separation process. As previously stated, although a spinning roller has previously been used in fixed-location conveyor applications to move ground fruits from one conveyor to another, it has never been used to separate stones and clods from the load, nor has it been used to break up clods so that they can pass beneath the shear roller as soil particles.

PREFERRED EMBODIMENT OF THE INVENTION

The method and apparatus of the present invention will now be described with reference to the attached drawing figures. It should be understood that the drawings are not drawn to scale and that many details of actual harvester construction have been omitted in the interest of simplicity and clarity. The drawings are more schematic than mechanical in nature, and are meant to be merely illustrative of the various aspects of the invention.

Figure 1:
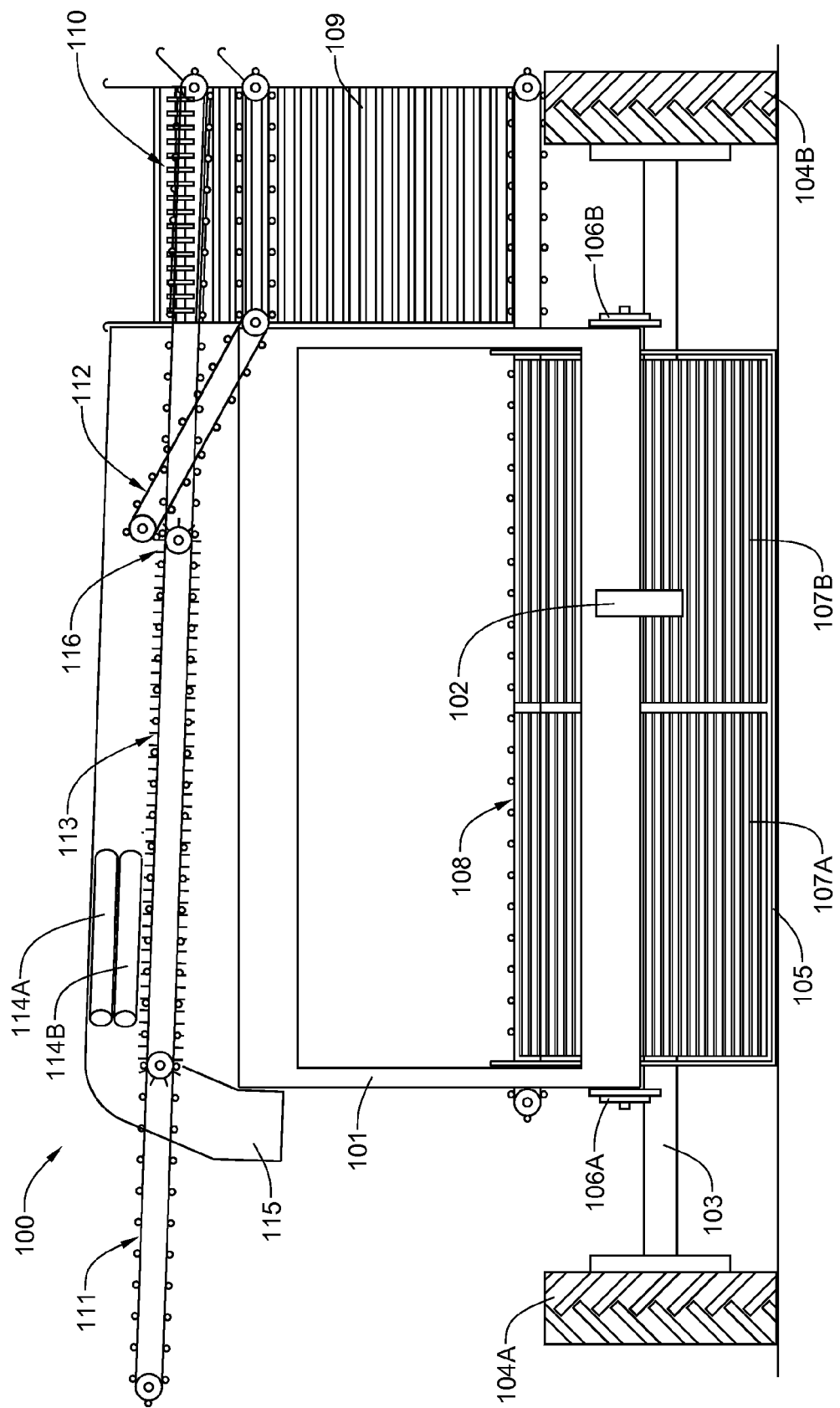
FIG. 1 is a front elevational view of a tuber, or ground fruit, harvester which incorporates the present invention.

Referring now to FIG. 1, a typical four-row tuber, or ground fruit, harvester 100, which is seen in a front view, includes: a main frame 101 to which is secured a tractor hitch 102; an axle 103 that is secured to the main frame 101; wheels 104A and 104B rotatably secured to opposite ends of the axle 103; a blade 105 that is pivotally mounted to the main frame 101 at pivots 106A and 106B; a pair of digger belted chains 107A and 107B, which transport ground fruits unearthed by the blade 105 to a transverse conveyor 108 at the rear of the harvester; a first elevator conveyor 109, which receives the harvested ground fruit load from the transverse conveyor 108 and elevates it to an entrance side of a cleaning table 110, a boom conveyor 111 which receives the cleaned load from the upper surface of the cleaning table 110 at the exit side thereof; a second elevator conveyor 112, which receives the fall through burden (including ground fruits of a fixed size and smaller, soil, stones, clods, stems and other debris) from the cleaning table 110 and elevates it back to, or somewhat above, the level of the boom conveyor 111; a pintle belt conveyor 113, which separates the small ground fruits from the soil, stones, stems and other debris; and stacked, upper and lower spinning shear rollers 114A and 114B, which not only offload the small ground fruits from the pintle belt conveyor 113 to the boom conveyor 111, but also break up dirt clods into soil. The soil, stones, stems and other debris fall between the pintles of the pintle belt conveyor 113 and are discarded down a chute 115 as the upper surface of the pintle belt conveyor reverses direction and is inverted on the return trip to the loading end 116 of the pintle belt conveyor 113.

Figure 2:
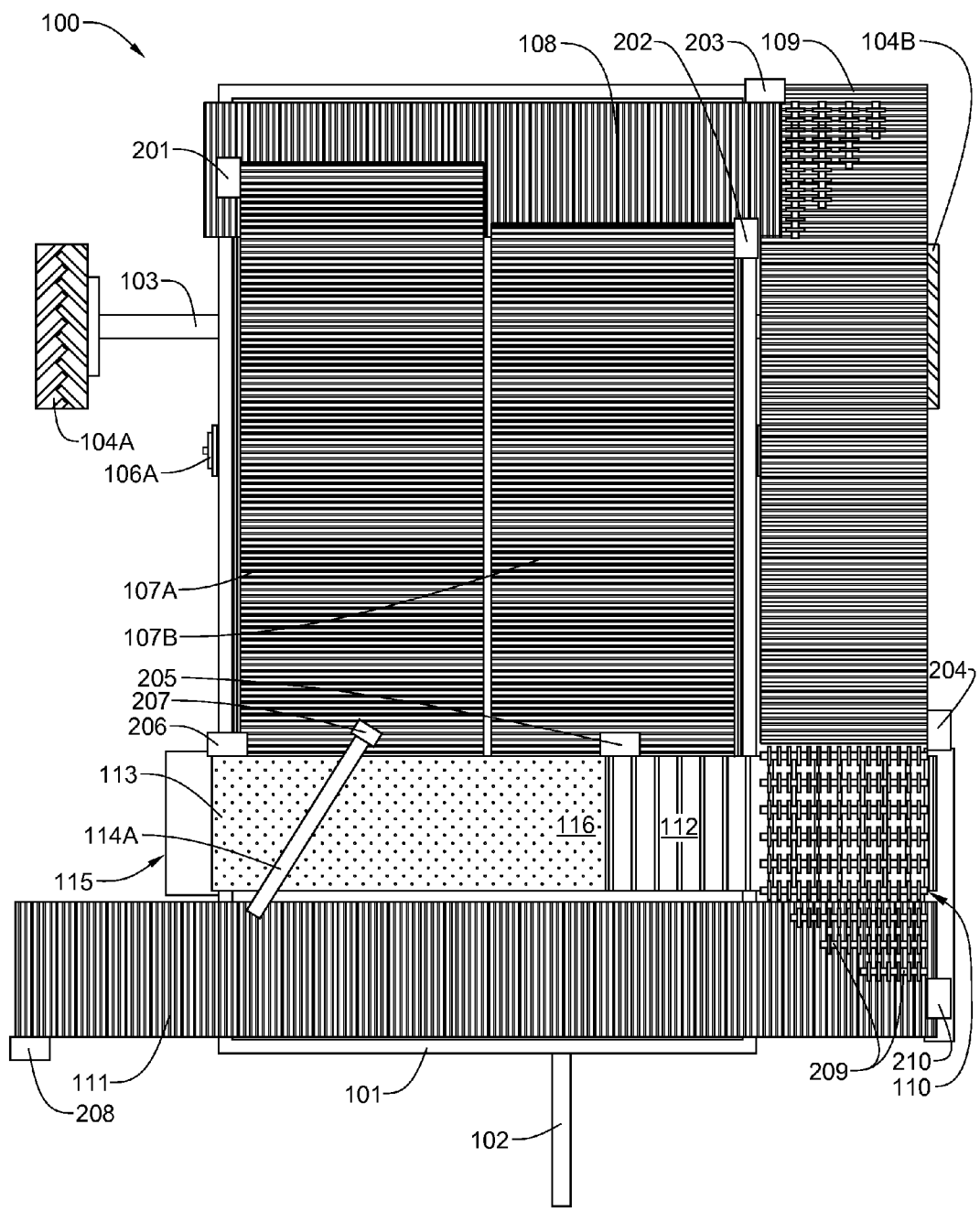
FIG. 2 is a top plan view of the ground fruit harvester of FIG. 1.

Referring now to FIG. 2, the typical four-row tuber harvester 100 of FIG. 1 is seen from the top. In this view, the main frame 101, the axle 103, the wheels 104A and 104B, the digger belted chains 107A and 107B, the transverse conveyor 108, the first elevator conveyor 109, the cleaning table 110, the boom conveyor 111, the second elevator conveyor 112, the pintle belt conveyor 113, the upper shear roller 114A, and the chute 115 are clearly visible.

Still referring to FIG. 2, each of the conveying surfaces and the shear rollers 114A and 114B are driven by hydraulic motors which are powered by high-pressure hydraulic fluid provided by a pump operated by a power take-off from the towing tractor (not shown). Hydraulic motor 201 drives digger belted chain 107A; hydraulic motor 202 drives digger belted chain 107B; hydraulic motor 203 drives the transverse conveyor 108 at the rear of the harvester 100; hydraulic motor 204 drives the first elevator conveyor 109; hydraulic motor 205 drives the second elevator conveyor 112; hydraulic motor 206 drives the pintle belt conveyor 113; hydraulic motor 207 drives both shear rollers through sprockets and a drive chain (not shown); and hydraulic motor 208 drives the boom conveyor 111. The rollers 209 of the cleaning table 110 are intercoupled via sprockets and chains or gears, and are driven by a hydraulic motor 210.

Figure 3:
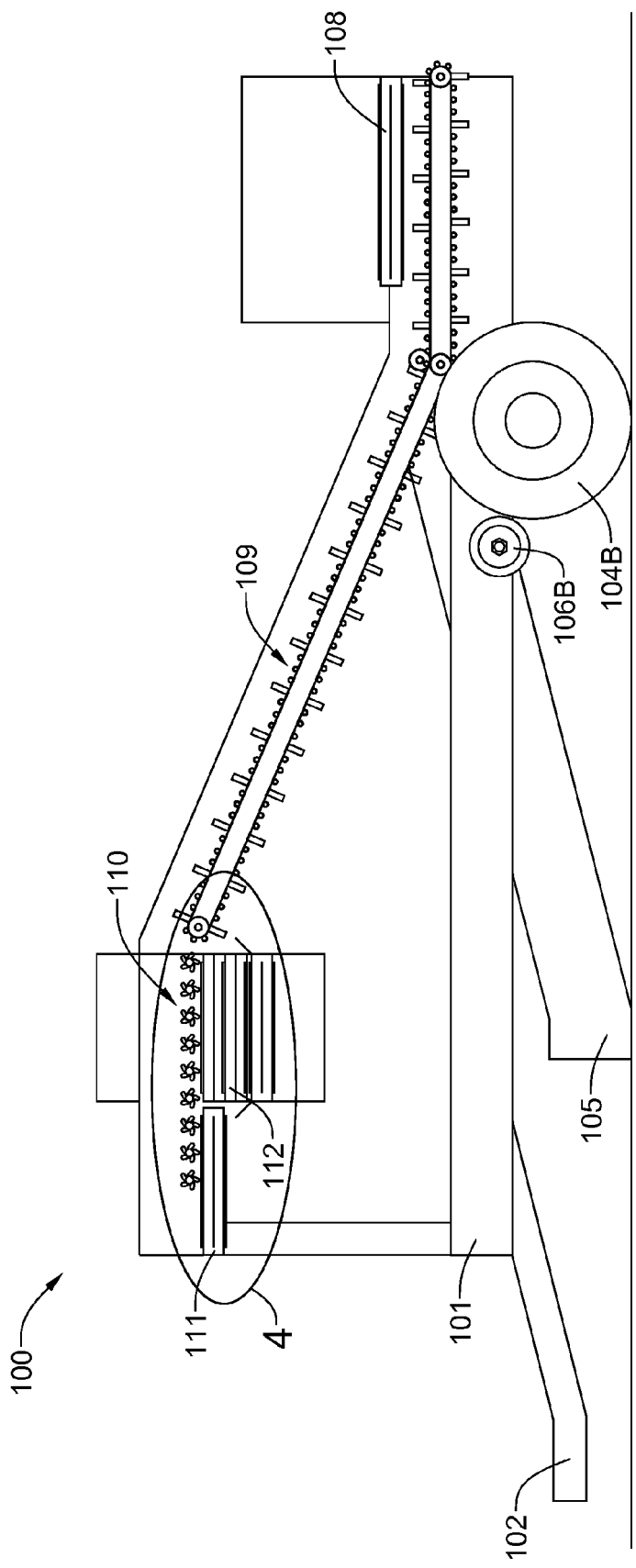
FIG. 3 is a left side elevational view of the ground fruit harvester of FIGS. 1 and 2.

Referring now to FIG. 3, the harvester 100 is seen from the left side. As the focus of the present invention centers on the ellipsoid region 4, that region will be shown as a closeup view in FIG. 4.

Figure 4:
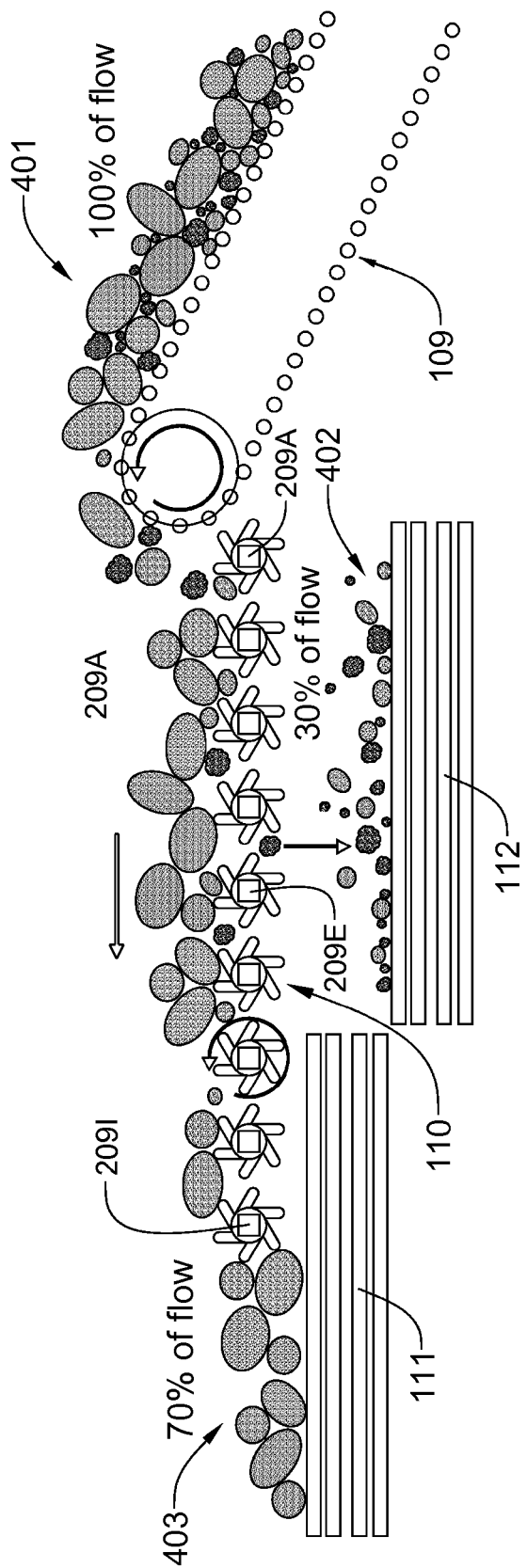
FIG. 4 is a close-up, partial left side elevational view of the ground fruit harvester of FIGS. 1, 2 and 3, taken from the vantage point of FIG. 3, and showing the discharge end portion of the first elevator conveyor, the cleaning table, the second elevator conveyor and the boom conveyor, in combination with a harvested ground fruit load.

Referring now to FIG. 4, a closeup view of the discharge end of the first elevator conveyor 109, the cleaning table 110, the second elevator conveyor 112 and the boom conveyor 111. For the embodiment of the invention shown and described, the cleaning table 110 has a generally level orientation and employs a plurality of finger or star rollers 209A-209I (209, generally), all of which rotate in the same direction. The entire harvested load 401 is discharged by the first elevator conveyor 109 onto the cleaning table 110. Spacing between the rollers 209 of the cleaning table 110 is set so that approximately thirty percent of the entire load is dropped as fall-through burden 402 onto the second elevator conveyor 112. The balance of the harvested load 403 is discharged onto the boom conveyor 111. The loading end of the second elevator conveyor 112, which is positioned beneath the cleaning table 110, receives the fall-through burden through the gaps between the rollers 201A-201I of the cleaning table 110. The fall-through burden 402 includes soil, stones, clods, vines, other debris and ground fruits which are smaller than a set size, which is determined by the spacing of the rollers 209A-209F and the shape and length of the resilient projections on those rollers. The cleaning table is opened to about 3 inch spacing (pitch) for russet potatoes. This spacing causes, typically about 3 inches for russets, and the small potatoes, soil, clod and stems are material is dropped through onto an elevating conveyor. This wide spacing results in about twenty percent of the harvested potatoes, along with soil, stones, clods, vines and other debris, to fall through the roller gaps in the cleaning table 110.

Figure 5:
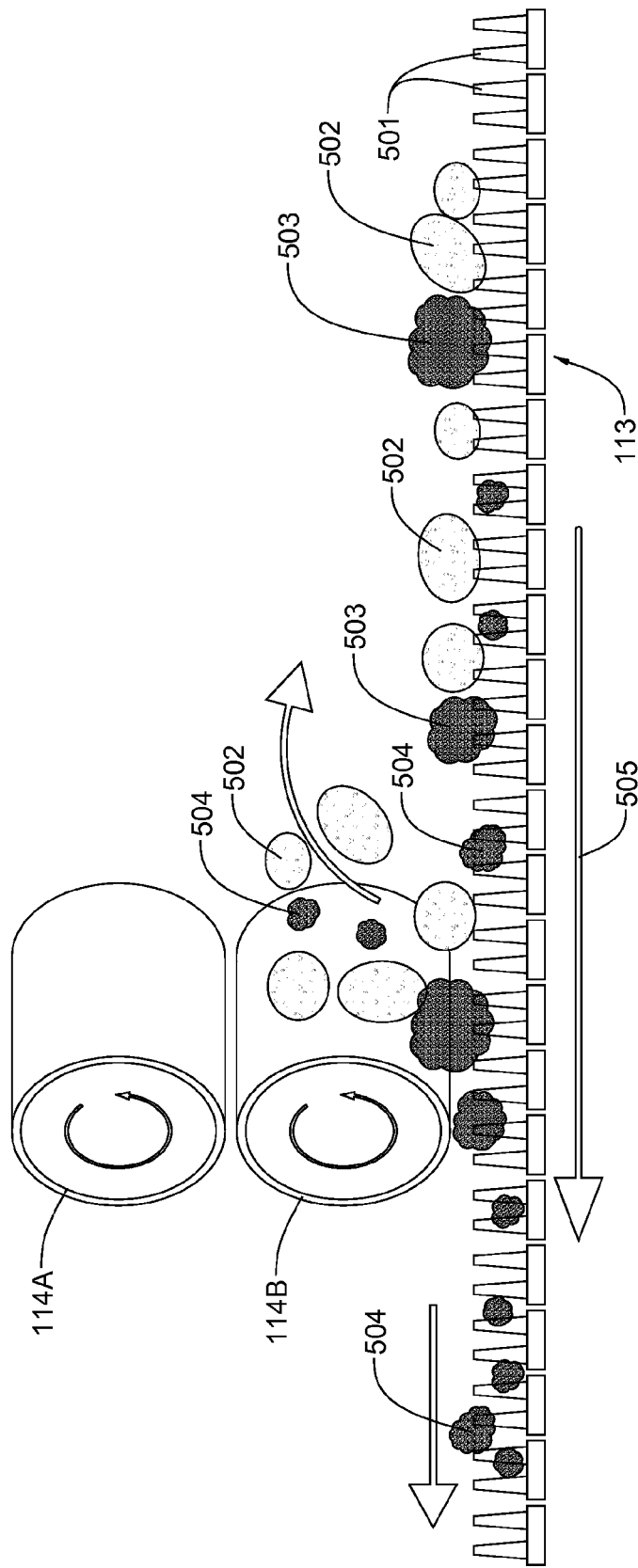
FIG. 5 is a side elevational view of the pintle belt conveyor in operation with a fall-through burden from the cleaning table.

Referring now to FIG. 5, the pintle belt conveyor 113 and the spinning shear rollers 114A and 114B are shown in a side view. The conveying surface of the pintle belt conveyor 113 is comprised of a multitude of upwardly-projecting conical-section fingers, which are called pintles 501. Soil, small stones, small clods, plant stems, and other debris 503 become trapped between the pintles 501, pass beneath the lower shear roller 114B, and fall to the ground when the conveying surface of the pintle belt conveyor 113 inverts on its return trip to the loading end. Larger clods and the smaller ground fruits 502 remain on top of the pintles 501. When the larger clods 503 strike the spinning shear rollers 114A or 114B, they are broken into smaller particles 504, which can fall between the pintles 501 and pass beneath the lower shear roller 114B. The small ground fruits 502, on the other hand, are offloaded onto the boom conveyor 111 (not shown in this view) by the shear rollers 114A and 114B, where they are combined with the larger ground fruits of the main load. It will be noted that the shear rollers 114A and 114B spin in a direction such that the lower surface of each roller is moving in a direction that is most nearly opposite that of the conveyance vector 505.

Through the use of both the cleaning table 110 and the pintle belt conveyor 113 in combination with the spinning shear rollers 114A and 114B, soil (dirt) clods are generally broken up into soil particles either by the fingers on the spinning cleaning table rollers 209A-209F, or by impact with the spinning shear rollers 114A or 114B while on the pintle belt conveyor 113. The smaller ground fruits and remaining clods from the fall-through burden remain on top of the pintles. The remaining clods typically disintegrate as they impact the spinning shear rollers 114A or 114B. The smaller ground fruits are diverted by the spinning shear rollers 114A and 114B to the boom conveyor which is transporting the larger ground fruits which did not fall through the gaps in the cleaning table 110. Soil particles, smaller stones, stems and other debris from the field fall between the pintles of the pintle belt conveyor 113, and are discarded down the chute 115 and onto the ground when the pintle belt conveyor 113 reverses direction.

The present invention is significant because it increases the total cleaning area of the harvester. With a large percent of the total harvested load removed, the fall-through burden from the cleaning table 110 can be cleaned much more effectively. In addition, with the larger ground fruits absent from the fall-through burden, the pintle belt can be run at faster speed without fear of bruising the larger ground fruits. Thus, the pintle belt conveyor becomes much more effective at separating the remaining smaller ground fruits from soil, clods, stems, etc. It removes soil very rapidly. With the pintle belt conveyor 113 installed, the harvester 100 can run faster in the field while using smaller spaced rods on the primary, secondary and conveyor chains, which permit recovery the smaller ground fruits. The pintle belt conveyor 113, in combination with the spinning shear rollers 114A and 114B, facilitates removal of the extra soil burden recovered with the load. In order to recover the smaller ground fruits, more-closely-spaced primary and secondary conveyor rods are employed in the harvester 100. Because it is cleaning only a small portion of the total number of recovered ground fruits, the pintle belt conveyor 113 can be operated at more than double the speed of an ordinary conveyor. In addition, the powered shear rollers 114A and 114B can also be rotated at higher speeds than would ordinarily be possible in order to facilitate the breakup of remaining clods. For a preferred embodiment of the invention, both the pintle belt conveyor 113 and the shear rollers 114A and 114B are powered by hydraulic drive motors, which permit speeds to be adjusted over a wide range. Even when belted conveyor chain with conventional spacing are used, cleaning of the load is greatly enhanced through the use of the cleaning table in combination with a pintle belt conveyor. The cleaning efficiency of present-day tuber, or ground fruit, harvester equipment can be greatly improved by separating the stream of larger ground fruits carried across a standard harvester's cleaning table from the cleaning table fall-through burden, which includes the smaller ground fruits, soil, stones, clods and stems and then subjecting that burden to a separate cleaning process on a pintle belt conveyor equipped with at least one powered shear roller.

This cleaning technology provided by the present invention as heretofore described can also be implemented as a ground fruit cleaner and sorter at a fixed location. In such an implementation, the powered shear rollers can be moved to discharge on either side of the conveyor. In one direction, the smaller ground fruits would be returned to the main flow, which includes the larger tubers. By reversing the angle of the shear rollers, the smaller ground fruits would be moved to a separate conveyor and maintained separate from the larger ground fruits of the main load. Thus the machine could be operated as either a simple cleaner, or as a sorters. In place of the hydraulic motors used on the harvester 100, variable speed electric motors can be employed to operate the conveyor belts, the pintle belt conveyor 113, the shear rollers 114A and 114B, as well as the star rollers 209 of the cleaning table 110.

Figure 6:
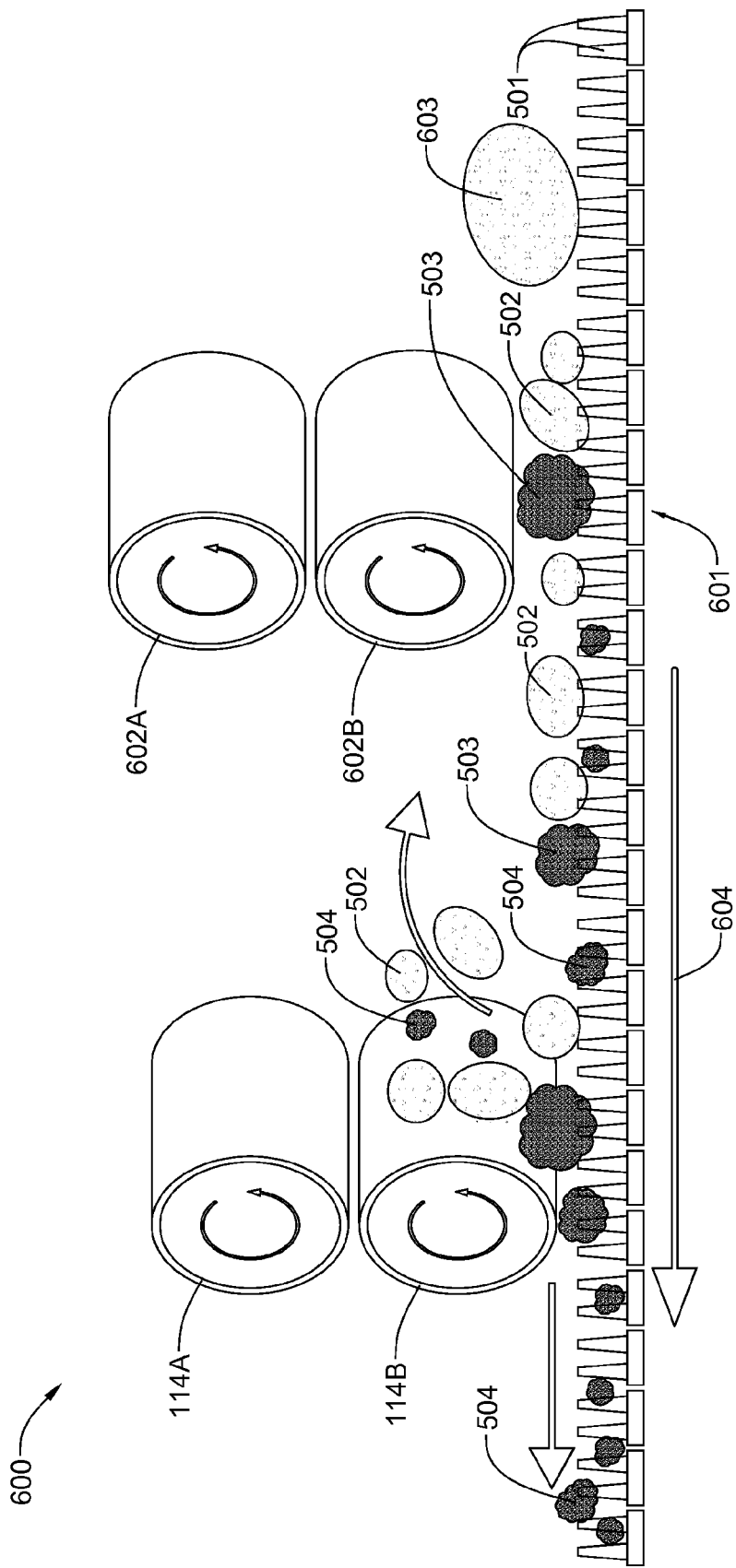
FIG. 6 is a side elevational view of a pintle belt of a ground fruit cleaner and sorter for fixed use.
Figure 8:
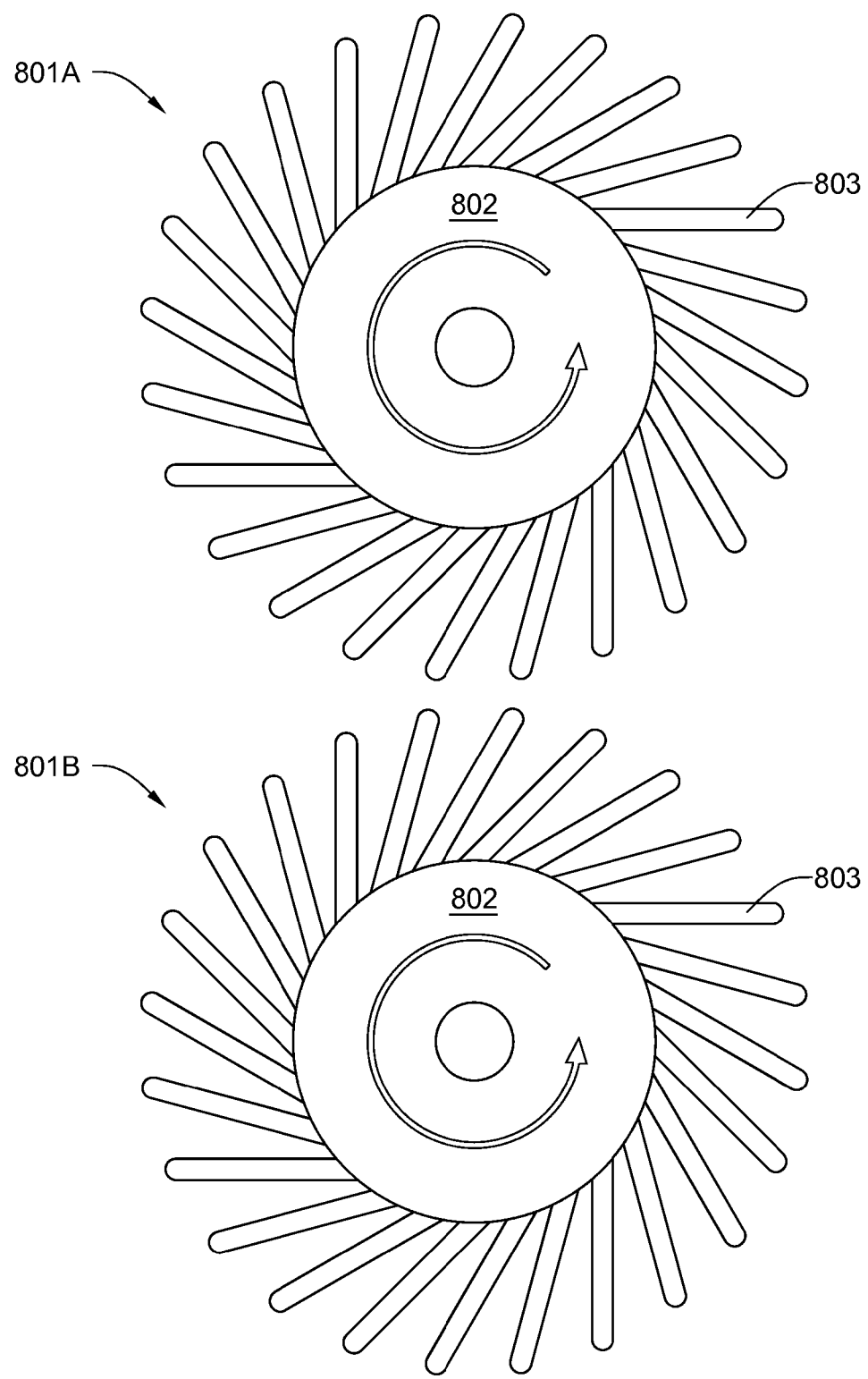
FIG. 8 is an end view of a pair of finger rollers which may be used in place of the auxiliary rollers of FIG. 6.

Referring now to FIG. 6, a ground fruit cleaner and sorter 600 has been designed for a fixed location. It includes an elongated pintle belt conveyor 601 onto which the full load is placed at the right-most end thereof. A conventional belt conveyor (not shown in this view) is located in the foreground. This arrangement is basically a super set of the pintle belt conveyor system mounted on the harvester 100. Instead of using a cleaning table 110 to remove soil, stones, clods, vines, other debris and ground fruit that are smaller than a set size determined by the roller spacing of the cleaning table 110, an auxiliary set of shear rollers 602A and 602B elevated above the pintle belt conveyor 601 are used as a ground fruit sorter. The auxiliary set of rollers 602A and 602B, which spin in a direction such that the bottom of each roller is moving in a direction that is most nearly opposite that of the conveyance vector 505, roll larger ground fruit 603 off the pintle belt conveyor 601 onto the conventional belt conveyor positioned in the foreground. Everything else (soil, stones, clods, vines, other debris and ground fruit that are smaller than a set size determined by the elevation of the auxiliary set of rollers 602A and 602B above the pintle belt conveyor 113) passes under the auxiliary set of rollers 602A and 602B. The primary rollers 114A and 114B operate in the manner heretofore described to separate the smaller ground fruits 502 from the clods 503, vines, stems, stones and soil. As the rollers are set in this drawing figure, the smaller ground fruits 502 are remerged with the large ground fruits 603 on the conventional conveyor. The auxiliary rollers 602A and 602B may be cylindrical metal rollers, as shown, or they may be flexible finger rollers, with a plurality of evenly-spaced flexible fingers extending from an inner cylindrical core. An example of such rollers is shown in FIG. 8. Finger rollers are preferred over cylindrical metal rollers, as they are considerably more efficient at gently picking the larger ground fruits 603 out of the load, and moving them rolling and spinning sideways to the clean and sized stream on the adjacent conventional conveyor belt.

Figure 7:
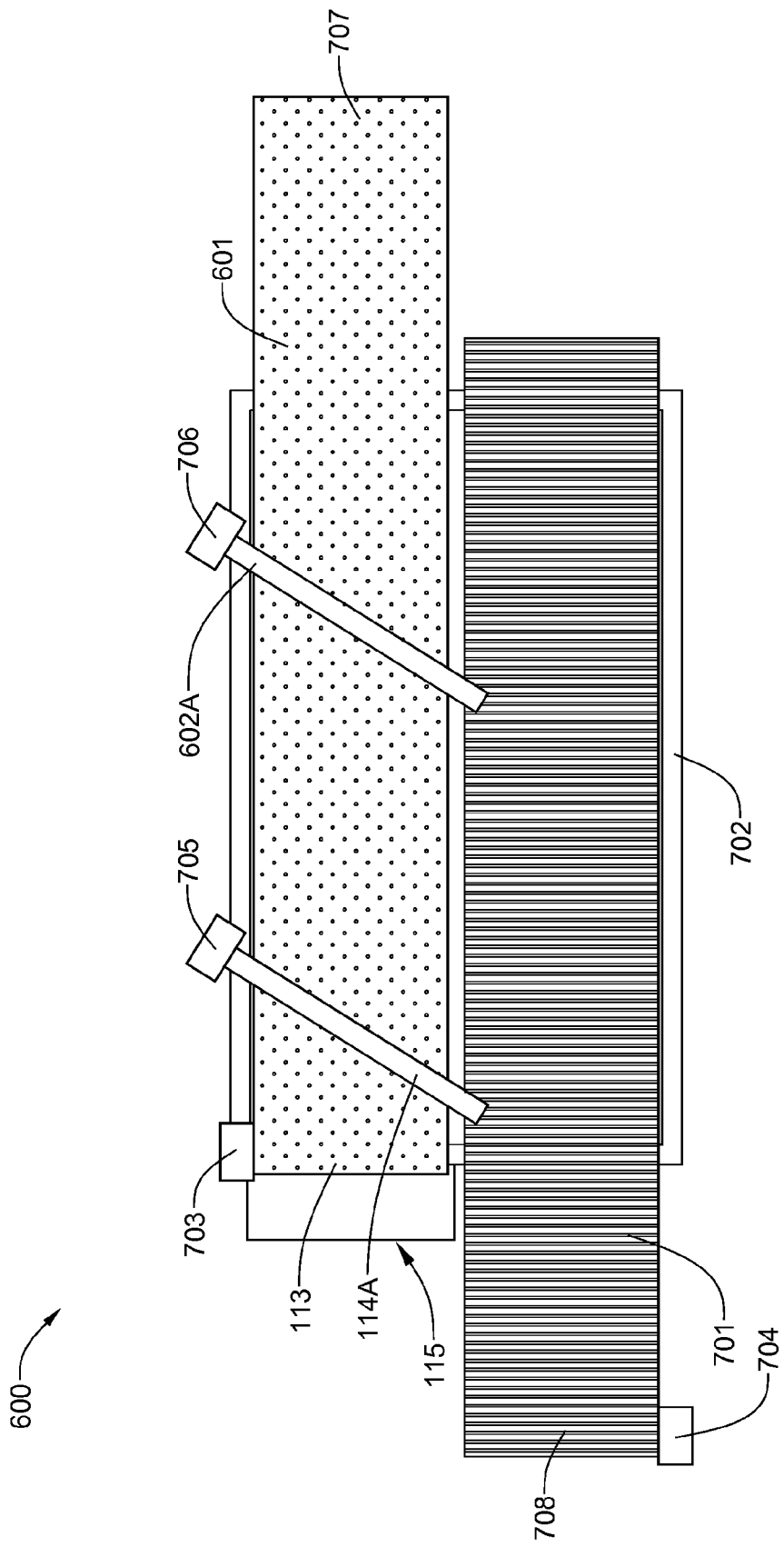
FIG. 7 is a top plan view of the ground fruit cleaner and sorter, a portion of which is shown in FIG. 6.

Referring now to FIG. 7, the complete ground fruit cleaner and sorter 600 is seen from above. The extended pintle belt conveyor 601 and an adjacent conventional conveyor 701 are mounted on a frame 702. The pintle belt conveyor 601 is powered by an adjustable-speed electric drive motor 703. The conventional conveyor 701 is also powered by an adjustable-speed electric drive motor 704. The primary rollers 114A and 114B (the latter not shown in this view), which are responsible for breaking up clods 503 and recovering smaller ground fruits 502, is also powered by an adjustable-speed electric drive motor 705. The auxiliary rollers 602A and 602B (the latter not shown in this view) are also powered by an adjustable-speed electric drive motor 706. The full harvested or stored ground fruit load, including soil, stones, clods, vines, other debris, are loaded onto the loading end 707 of the pintle belt conveyor 601. Ground fruit is recovered at the discharge end 708 of the adjacent conventional conveyor 701. The auxiliary rollers 602A and 602B are elevated above the pintle belt conveyor 601, so that they generally roll only large ground fruits onto the conventional conveyor 701. The remaining load passes beneath the auxiliary rollers 602A and 602B and is processed by the primary rollers 114A and 114B. Soil, stones, clods, vines, and other debris are discharged by the pintle belt conveyor 601 into chute 115 as it reverses direction. Small ground fruits are offloaded by primary rollers 114A and 114B onto the conventional conveyor 701.

Referring now to FIG. 8, a pair of finger rollers 801A and 801B are shown looking down the axis of each. Each roller has a cylindrical core 802 and a plurality of flexible fingers 803, which project non-radially from cylindrical core at a uniform angle. The non-radial projection of the flexible fingers cushions the sorting process and gently removes large ground fruits 603 from the pintle belt conveyor 601.

Although only a single embodiment of the cleaning and separation system for ground fruits is shown and described, it will be obvious to those having ordinary skill in the art that changes and modifications may be made thereto without departing from the scope and the spirit of the invention as hereinafter claimed.

What is claimed is:

1. A separation and cleaning process for harvested ground fruit comprising the steps of:
    subjecting an entire harvested ground fruit crop load to a first separation step on a cleaning table, whereby ground fruit of and below a set size, soil, stones, clods, stems, grasses and other debris fall through the cleaning table as fall-through burden;
    subjecting the fall-through burden to a second separation step using a continuous-loop, pintle belt conveyor having a conveying surface provided by pintle tips, a conveyance path and a conveyance vector, in combination with a spinning shear roller positioned immediately adjacent but not in contact with said conveying surface, said shear roller having an axis of rotation that is both parallel to said conveying surface and non-orthogonal to said vector of conveyance, and a direction of rotation that resists entry of conveyed objects between the roller and said conveying surface, whereby said conveyance path is blocked for small ground fruits and clods by said spinning shear roller, which moves the small ground fruits on an exit path oblique to said conveyance vector and breaks up large clods into small clods and soil particles, and whereby soil particles, small clods, stones, vine stems, grasses, and other debris fall between pintles of the pintle belt conveyor, pass beneath said spinning shear roller, and are discarded.

2. The separation and cleaning process of claim 1, wherein said exit path recombines the smaller ground fruit from the fall-through burden with ground fruits larger than the set size.

3. The separation and cleaning process of claim 1, wherein said exit path is separate from a path taken by the ground fruits larger than the set size.

4. The separation and cleaning process of claim 1, wherein operational speed of the pintle belt conveyor and rotational speed of said shear roller are adjustable to facilitate breakup of clods which impact said shear roller.

5. The separation and cleaning process of claim 1, wherein soil particles, stones, clods, vine stems, grasses and other debris that have fallen between pintles of the pintle belt conveyor, are discarded when the pintle belt conveyor passes over an end roller and reverses direction.

6. The separation and cleaning process of claim 1, wherein said set size is determined by cleaning table roller spacing.

7. The separation and cleaning process of claim 1, wherein spacing between rollers of said cleaning table is set so that approximately thirty percent of the entire load is dropped as fall-through burden.

8. The separation and cleaning process of claim 1, wherein the full fall-through burden from the cleaning table is dropped onto a second elevator conveyor, which conveys said full fall-through burden to the pintle belt conveyor.

9. The separation and cleaning process of claim 7, wherein said cleaning table has a plurality of star rollers, all of which rotate in the same direction.

10. The separation and cleaning process of claim 9, wherein said star rollers are set to have about three-inch spacing between adjacent roller axes for russet potatoes.

\* \* \* \* \*